United States Patent [19]

Vasilevskis

[11] Patent Number: 5,376,353
[45] Date of Patent: Dec. 27, 1994

[54] METHOD FOR THE PRODUCTION OF $H_2O_2$ USING FULLERENES

[76] Inventor: Janis Vasilevskis, 327 Blossom Valley, Los Gatos, Calif. 95032

[21] Appl. No.: 81,252

[22] PCT Filed: Oct. 26, 1992

[86] PCT No.: PCT/US92/09052

§ 371 Date: Jun. 25, 1993

§ 102(e) Date: Jun. 25, 1993

Related U.S. Application Data

[63] Continuation-in-part of Ser. No. 906,305, Jun. 26, 1992, abandoned, which is a continuation-in-part of Ser. No. 874,349, Apr. 24, 1992, abandoned, which is a continuation of Ser. No. 842,871, Feb. 26, 1992, abandoned, which is a continuation of Ser. No. 814,384, Dec. 26, 1991, abandoned, which is a continuation-in-part of Ser. No. 782,254, Oct. 28, 1991, abandoned.

[51] Int. Cl.$^5$ ............................................. C01B 15/024
[52] U.S. Cl. ...................................... 424/591; 423/587
[58] Field of Search ................................ 423/587, 591

[56] References Cited

U.S. PATENT DOCUMENTS 4,131,646 12/1978 Gosser .

FOREIGN PATENT DOCUMENTS 0132294 1/1985 European Pat. Off. .

OTHER PUBLICATIONS

Elvers et al., eds., "Hydrogen peroxide" *Ullmann's Encyclopedia of Industrial Chemistry* (1989) VCH Verlag, Weinheim, Germany, vol. A13, pp. 443–466.

Ismail, "Sublimation and heterogenous reactions of fullerene ($C_{60}$) in different gases" *Preparation Papers American Chemical Society, Division of Fuel Chemistry* (1991) 36:1026–1035.

Haufler et al., "Efficient production of $C_{60}$ (Buckminsterfullerene), $C_{60}H_{36}$, and the solvated buckide ion" *J. Phys. Chem.* (1990) 94:8634–8636.

*Primary Examiner*—Wayne Langel
*Attorney, Agent, or Firm*—Morrison & Foerster

[57] ABSTRACT

This invention is a process for the production of $H_2O_2$ using fullerene. The process involves the hydrogenation of the fullerenes and the reaction of the hydrogenated fullerenes with $O_2$ to produce $H_2O_2$. Preferably the process utilizes a two-phase reaction mixture of a solvent and water. The solvent solvates the fullerenes and any applicable hydrogenation catalyst. The $H_2O_2$ is extracted into the water phase for removal from the process.

10 Claims, No Drawings

METHOD FOR THE PRODUCTION OF $H_2O_2$ USING FULLERENES

RELATED APPLICATION

This application is a continuation-in-part of Ser. No. 07,906,305, filed Jun. 26, 1992, entitled "Method for the Production of $H_2O_2$ Using Fullerenes" by Janis Vasilevskis, abandoned, which in turn is a continuation-in-part of Ser. No. 07,874,349, filed Apr. 24, 1992, entitled "Method for the Production of $H_2O_2$ Using Fullerenes" by Janis Vasilevskis, abandoned, which application in turn is a continuation of Ser. No. 07,842,871, filed Feb. 26, 1992, entitled "Method for the Production of $H_2O_2$ Using Fullerenes" by Janis Vasilevskis, abandoned, which application is in turn a continuation of Ser. No. 07,814,384, filed Dec. 26, 1991, entitled "Method for the Production of $H_2O_2$ Using Fullerenes" by Janis Vasilevskis, abandoned, which application is in turn a continuation-in-part of Ser. No. 07,782,254, filed Oct. 28, 1991, entitled "Method for the Production of $H_2O_2$ Using Buckminster-Fullerenes" by Janis Vasilevskis, abandoned, the entirety of which are incorporated by notice.

FIELD OF THE INVENTION

This invention is a process for the production of $H_2O_2$ using fullerenes, including buckminster-fullerene. The process involves the hydrogenation of the fullerenes and the reaction of the hydrogenated fullerenes with $O_2$ to produce $H_2O_2$. The process utilizes a hydrogenation catalyst and may involve a single phase reaction medium either aqueous or solvent-laden or a two-phase reaction mixture of a solvent and water. The solvent solvates the fullerenes and may solvate the hydrogenation catalyst. The $H_2O_2$ enters the water phase for removal from the process.

BACKGROUND OF THE INVENTION $H_2O_2$ is a weakly acidic, clear, colorless liquid miscible in all proportions with water. It is widely used in bleaching operations, in the preparation of other peroxygen compounds, and as an oxidizing agent.

Most $H_2O_2$ is currently made using a process involving an anthraquinone compound as the hydrogen carrier. This process was first operated in Germany during World War II. In the process, an alkyl-anthraquinone such as a 2-alkyl-anthraquinone is dissolved in a in a solvent system such as a mixture of benzene and $C_7$–$C_9$ alcohols, trialkylphosphates, tetraalkyl-substituted ureas, dialkylcarboxylic acid amides, 1,3,5-tritetraalkylazene, 2,6-dialkylcyclohexane, pivalic esters, mono- and diacetylbenzoquinone, and diacetylbenzene. The dissolved anthraquinone or "working solution" is mixed with with hydrogen and a hydrogenation catalyst such as palladium-black, Raney nickel, or nickel boride. The anthraquinone is reduced to the corresponding anthraquinol (or anthrahydroquinone). The working solution is separated from the catalyst and contacted with air to again produce the anthraquinone. Simultaneously $H_2O_2$ is formed and is then extracted with $H_2O$ to form an $H_2O_2$ solution. The $H_2O_2$ solution is purified and concentrated if needed. The working solution is recycled.

This process suffers form a wide variety of maladies. Many involve secondary "over-reduction" reactions or degradation reactions of the anthraquinone during the process cycle. The solvents are often degraded through oxidation. Many of the resulting byproducts end up in the aqueous $H_2O_2$ solution and must be subsequently removed thereby adding to the cost of the process.

The inventive process does not involve the use of anthraquinone but instead uses fullerenes as the hydrogen carrier.

SUMMARY OF THE INVENTION

This invention is a process for the production of $H_2O_2$ using fullerenes. The process involves the catalytic hydrogenation of the fullerenes and the reaction of the hydrogenated fullerenes with $O_2$ to produce $H_2O_2$. Although the process may utilize a two-phase reaction mixture of a solvent and water, a single aqueous or solvent phase is also applicable. The $H_2O_2$ is extracted into the water phase for removal from the process.

DETAILED DESCRIPTION OF THE INVENTION

This invention is a process for the production of $H_2O_2$ using fullerenes. The process involves the catalytic hydrogenation of the fullerenes and the reaction of the hydrogenated fullerenes with $O_2$ to produce $H_2O_2$. The process may utilize a two-phase reaction mixture of a solvent and water or an aqueous or solvent single phase. In the two-phase or solvent reaction mixture, the solvent solvates the fullerenes and any applicable hydrogenation catalyst. The $H_2O_2$ is extracted into the water phase for removal from the process.

Fullerene hydrogen carrier

Fullerenes, recently discovered by Smalley, Curl, Kroto, Heath and O'Brien [*Nature*, 318, 162 (1985)], are representative of a set of carbon molecules which have been shown to have both aromatic and olefinic character. The simplest of the fullerene molecules is a sperical $C_{60}$ molecule, called buckminster-fullerene, with the geometry of a truncated icosahedron—a polygon with 60 vertices and 32 faces, 12 of which are pentagons and 20 are hexagons. Other fullerene molecules have been identified and include $C_{70}$, $C_{76}$, $C_{78}$, $C_{84}$, $C_{90}$, $C_{94}$, and others up to $C_{266}$. See, Parker et al, J. Am. Chem. Soc. 1991, 113, 7499–7503.

Methods for the production of fullerenes have been described in a number of journals. For instance, in J. Phys. Chem. 1990, 94, 8634–8636, Haufler et al describe an apparatus and a process for producing fullerenes in which a graphite rod is vaporized in an arc using a 100–200 A current in a helium atmosphere held near 100 Torr. The resulting soot is extracted with boiling toluene to form a dark red-brown liquid of the $C_{60}$ and which typically contains about 10% of the original soot.

Haufler et al also shows that the $C_{60}$ buckminster-fullerene may be hydrogenated to form a $C_{60}H_{36}$ molecule and subsequently dehydrogenated to $C_{60}$ without substantial alteration of the molecule.

Additionally, Hawkins et al have shown [J. Org. Chem. 1990, 55, 6250–6252 and Science 1991, 252, 312–313] that $C_{60}$ buckminster-fullerene may be functionalized. Hawkins et al utilizes osmium tetraoxide and pyridine to produce an ester.

Cioslowski has reported [J. Am. Chem. Soc. 1991, 113, 4139–4141] that $C_{60}$ buckminster-fullerene could form cages about several ions including F, Ne, $Na^+$, $Mg^{2+}$, and $Al^{3+}$.

Fagan et al [Science 1991, 252, 1160–1162] have shown that buckminster-fullerene $C_{60}$ may be easily formed into cyclopentadienyl platinum group metal complexes.

Selig et al [J. Am. Chem. Soc. 1991, 113, 5475–5476] shows that $C_{60}$ and $C_{70}$ fullerenes may be readily fluorinated using a low pressure (at several hundred Torr) fluorine gas to form neutral fluorinated compounds of up to about $C_{60}F_{46}$. Holloway et al [J. Chem. Soc., Chem. Commun., 1991, 14, 966–969] similarly shows the production of $C_{60}F_{60}$ buckminster-fullerene without the apparent degradation of the buckminster-fullerene core molecule.

Krusic et al [J. Am. Soc. 1991, 113, 6274–6275] shows that fullerenes may be easily alkylated using known techniques.

The fullerene molecule has been shown to be quite stable to oxidation in a 25% $O_2$ atmosphere at temperatures lower than about 500° C. [Vassallo et el, J. Am. Chem. Soc. 1991, 113, 7820–7821].

The production of solid fullerene/metal containing materials is shown [H. Nagashima, J. Chem. Soc.-Chem. Con., 1992, 377–79]. Polymeric materials of $C_{60}$ fullerene, palladium, and dibenzylidene acetone are described.

The fullerene molecule used in the inventive process may be any of the molecules listed above or others of the genre and, as required by the choice of solvent and hydrogenation catalyst, may be alkylated, fluorinated, modified to contain a metal or molecule within the fullerene molecule or to contain a metal on the fullerene surface or in the fullerene cage. The fullerene molecule may be complexed with a metal-containing ligand which may act as a hydrogenation component integrated with the fullerene. The fullerene molecule may be converted into a heterogeneous form by the processes noted above. These modifications to the fullerene molecule are a matter of technical choice to tailor the solubility of the fullerene molecule to the chosen solvent, to form a heterogeneous fullerene material which is not soluble, or to modify the reaction rate of the fullerene molecule or to enhance the stability of the fullerene molecule.

The molecule used in the process and containing the fullerene core may desirably be converted to one having a metal-containing hydrogenation catalyst, e.g., platinum group metals such as Pd, Pt, Ru, etc., complexed to the fullerene molecule (e.g., $C_{60}[(ML_n)_m]$ where "M" is one or more of the noted hydrogenation metals and "L" represents one or more ligands as needed to stabilize the metals) or adsorbed on the surface or substituted for one or more carbon atoms in the fullerene core. In this way the hydrogenation catalyst need not necessarily be separately added to the process.

Process

This invention is a process for the production of $H_2O_2$ using a molecule containing the fullerene core. The process involves the hydrogenation of the fullerene and the reaction of the hydrogenated fullerene with $O_2$ to produce $H_2O_2$.

The process may utilize a two-phase reaction mixture of a solvent and water. The solvent may solvate the fullerenes and any applicable hydrogenation catalyst. If the fullerenes have been modified to a heterogeneous form, the solvent need not solvate the catalyst and fullerene. The $H_2O_2$ is extracted into the water phase for removal from the process. As noted below, the process may also be operated in a single liquid phase and either in continuous or in batch mode.

The process is straightforward. In one variation of the process, one or more of the fullerene core carbons is replaced with a hydrogenation metal, e.g., Pd, so that the hydrogenation catalyst is a part of the fullerene structure. These structures are soluble in hydrocarbon solvents which are not miscible with water and which would not oxidize under the peroxide synthesis conditions. The solvents should be substantially insoluble in water or in aqueous solutions containing $H_2O_2$, e.g., aromatics or chlorinated aliphatics.

In the process of the present invention, an organic solution of $C_{z-x}Pd_x$ (where "z" represents the number of carbons necessary to form a determinate fullerene structure) is contacted with a water phase and then reacted with a mixture of $H_2/O_2$ (outside of explosive limits) to produce hydrogen peroxide. The relative rates of hydrogenation/oxidation determine the various structures $C_{z-x-y}Pd_xH_y$ which are present in solution. The peroxide which is formed is not soluble in the hydrocarbon and therefore is continuously extracted into the aqueous phase. As a result, it does not displace oxygen as the oxidant in the hydrocarbon phase thus avoiding reduction to water and giving high selectivity to hydrogen peroxide. The fullerene cores are stable under the reaction conditions which make it possible to attain high (e.g., >20%) concentrations of $H_2O_2$ without peroxide contamination or catalyst/reaction carrier degradation. The fullerene containing molecule is desirably used in as high a concentration as is possible to provide the highest production rates but obviously lower concentrations would be acceptable. The reaction should be operated at as low a temperature and pressure as is convenient so to simplify the cooling of the reaction mixture and obviate the need for expensive pressure vessels. Preferably, the reaction is operated at room temperature and at atmospheric pressure although temperatures from below room temperature to about 100° C. and pressures from about atmospheric to about 500 psig are appropriate.

The process may also be operated in a continuous fashion, e.g., contact of the hydrocarbon/fullerene/hydrogenation catalyst mixture with hydrogen, followed by contact of the hydrogenated fullerenes with oxygen and water to form an $H_2O_2$ solution, and recycle of the fullerenes. The process may also be be operated semi-continuously with the cycling of $H_2/O_2$ mixtures and water.

Other variations of the process include:

1. The fullerene-containing hydrogen carrier may be alkylated, fluorinated, or made to contain a metal or molecule within the fullerene molecule. These modifications to the fullerene containing core molecule are a matter of technical choice to tailor the solubility of the fullerene molecule to the chosen solvent or to modify the reaction rate of the fullerene molecule or to enhance the stability of the fullerene molecule.

2. The manner by which the fullerene-containing molecule is reduced may be changed in a number of ways. The molecule containing the fullerene core may desirably be converted to one having a hydrogenation metal, e.g., Pd, Pt, Ru, etc., complexed to the fullerene molecule (e.g., $C_{60}[(ML_n)_m]$ where "M" is one or more of the noted hydrogenation metals and "L" represents one or more ligands as needed to stabilize the metals) or adsorbed on the surface or substituted for one or more carbon atoms in the fullerene core. Attachment of the catalytic metal to the surface of the fullerene core likely provides added stabilization of the metal complex.

The hydrogenation catalyst may be homogeneous and dissolved in the hydrocarbon layer. Salts or complexes of the hydrogenation catalysts, e.g., Pd, Pt, Ni (using ligands such as phosphines or aryl groups which stabilize the metal and allow it to be solubilized in the hydrocarbon phase) are appropriate. The dissolved catalyst should be selected also using the criteria that it not degrade by oxidation.

A heterogeneous hydrogenation catalyst comprising, e.g., platinum group metals such as Pd, Pt, Ru, etc., is useful so long as the catalyst is preferentially wet by the hydrocarbon phase. An example of such a catalyst is palladium on partially fluorinated carbon. The catalyst in this example also produces $H_2O_2$ independently of the fullerene.

Since the fullereness will support a negative charge, they can be used to stabilize metal colloids of, e.g., $Pd_0$, to provide $Pd_0$/fullerenes colloid $H_2O_2$ reaction systems for inclusion in the hydrocarbon phase.

Another variation involves a one-liquid-phase (hydrocarbon or aqueous) system having a catalyst system which repels $H_2O_2$ so that it does not return to the active catalyst site. Partially alkylated or fluorinated fullerenes hydrogen carrier systems (such as $C_{60}PdF_6$ in a heterogeneous catalyst or $C_{60}F_6$ with adsorbed $Pd^0$) have the desired properties.

Another variation includes the concept of forming the fullerene into a heterogeneous form.

Still another variation is the use of an electrode of fullerene which would then be reduced with electrons. The surface would be protonated by protons in solution. Reaction with oxygen would then produce $H_2O_2$. The protons would be replenished by oxidation of hydrogen at the other electrode made of a conductive material. A proton conducting between the electrodes would have the advantage of not allowing $O_2$ and $O_2$ in the same compartment.

Finally, the process may be operated in a batch mode; the oxygen and the hydrogen are alternated over the fullerene containing solution.

EXAMPLE

This Example demonstrates the use of fullerene as a hydrogen carrier in a process of producing $H_2O_2$.

A $C_{60}$-fullerene solution containing a Pd catalyst was contacted with $H_2$ at temperatures between 45°–65° C. The solution was then contacted with $O_2$. A white silky precipitate formed. Testing of the solution with $KMnO_4$ indicated the presence of $H_2O_2$.

In another series of experiments, the hydrogenated solution was contacted with a solution of eAQ and extracted. The amount of $H_2O_2$ formed was equal to about 30% of hydrogen under the assumption that the hydrogenated fullerene had the formula $C_{60}H_{36}$. The white precipitate was also formed.

It should be clear that one having ordinary skill in this art would envision equivalents to the processes found in the claims that follow and that those equivalents would be within the scope and spirit of the claimed invention.

I claim as my invention:

1. A process for the production of $H_2O_2$ comprising the steps of:
   a.) hydrogenating a solution containing one or more fullerene-containing compounds to produce hydrogenated fullerene-containing compounds,
   b.) contacting the hydrogenated fullerene-containing compounds with oxygen to produce $H_2O_2$, and
   c.) recovering the $H_2O_2$.

2. The process of claim 1 where the hydrogenating step is catalytic.

3. The process of claim 2 where the hydrogenation catalyst is integral with the fullerene.

4. The process of claim 2 where the hydrogenation catalyst is separate from the fullerene.

5. The process of claim 2 where the hydrogenation catalyst and the fullerene are a separate heterogeneous material.

6. The process of claim 2 where the hydrogenation catalyst and the fullerene are homogenous with the solution.

7. The process of claim 2 where the solution comprises a two phase mixture of a solvent and water.

8. The process of claim 2 where the solution comprises a solvent.

9. The process of claim 2 where the solution is aqueous.

10. The process of claim 2 where the hydrogenation and contacting with oxygen steps take place by contact of the solution with a $H_2/O_2$ stream.

* * * * *